July 24, 1962 H. S. CAMPBELL 3,046,045
UNIVERSAL SLING SYSTEMS
Filed Jan. 26, 1960
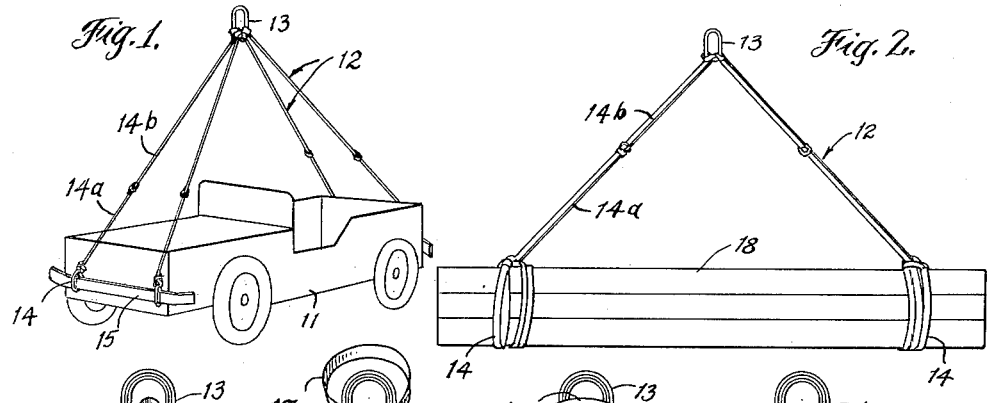
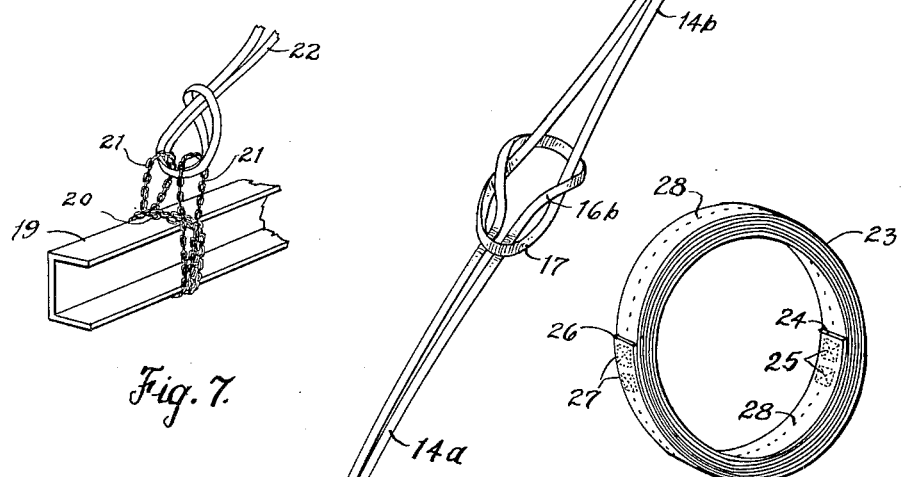
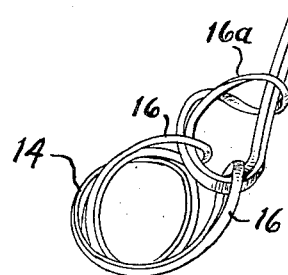
INVENTOR
HARRIS S. CAMPBELL
Raymond W Cotton
ATTORNEY

United States Patent Office 3,046,045
Patented July 24, 1962

1

3,046,045
UNIVERSAL SLING SYSTEMS
Harris S. Campbell, Bryn Athyn, Pa., assignor to Eastern Rotorcraft Corporation, Doylestown, Pa., a corporation of Pennsylvania
Filed Jan. 26, 1960, Ser. No. 4,654
5 Claims. (Cl. 294—74)

This invention relates to lifting sling assemblies and is more particularly directed to slings having a plurality of legs made up from elements which may be assembled to accommodate a variety of conditions.

Loads carried underneath helicopters take many different forms such as wheeled vehicles, palletized loads, drums, structures, aircraft and the like. Slings which can be accommodated to such varied loads must be capable of being used in different ways to provide a suitable connection to the load and to permit use of slings having two, three, four or even more legs of any desired lengths. In addition the loads being carried are sometimes fragile and in releasing a sling from the carrying hook after setting the load down it is desirable to provide a sling construction which will not damage the load when dropped on it.

One of the main objects of the present invention is to provide a simple and versatile sling system with elements which can be connected to the load and to other sling elements without the need for metal connector parts.

Another object is to provide a sling system which allows the assembly of the sling legs to the length required by sequential connection of the elements from the lower end upwardly. The upper ends of the legs are then connected to a common ring member for engaging the lifting hook. Flexible sling elements having loops at each end provide for such assembly.

Still another object is the provision of a sling ring fabricated from webbing or the like to provide in association with webbing or rope legs a sling which can be dropped on vehicles or other cargo without causing dents or other damage.

In some instances a cargo, such as metal objects, having edges which might damage webbing elements must be lifted. It is an object of the invention to provide in the sling system flexible elements having looped ends formed from chain to be used in situations where webbing elements might be damaged.

How these and other objects and advantages are accomplished will be clear from the following description of the drawings in which—

FIGURE 1 is a perspective view showing a load attached to a four leg sling constructed in accordance with the present invention.

FIGURE 2 is a view showing a typical load supported by a two leg sling constructed according to the present invention.

FIGURE 3 is a view to an enlarged scale showing a typical single leg for a sling such as illustrated in FIGURES 1 and 2.

FIGURES 4, 5 and 6 illustrate the steps for attaching the upper end of a sling leg to a supporting ring.

FIGURE 7 is a perspective view illustrating the connection of the lower end of a sling leg to certain types of loads.

FIGURE 8 illustrates a sling ring construction suitable for use with the present invention.

Referring to the figures, FIGURE 1 illustrates a load in the form of a vehicle 11 arranged to be supported by means of a four leg sling. Each leg 12 is connected at its upper end to ring 13 and may be formed in the manner illustrated in FIGURE 3. Each leg of the sling includes a tension member 14 formed of flexible material such as woven or fabric webbing or rope. The member

2

14 is wrapped around a suitable support attached to the load, such as the bumper member 15 of the vehicle 11. The end loops 16 of the tension member 14 are then positioned and a second tension member 14a has one of its looped ends 16a passed through the loops 16 after which the member 14a is threaded through the loop 16a and extended upwardly. When additional length is required for the leg a second tension member 14b may be attached to the upper looped end 16b of member 14a by threading the looped end 17 of member 14b through the loop 16b and then passing member 14b through loop 17 in the manner described for the lower end connection of member 14a. This connection will then take the configuration shown at 16b in FIGURE 3 to form a square knot connection between members 14a and 14b. Member 14b may be either the same length as member 14a or a different length depending upon the length of the sling leg required to support the load.

The upper end of tension member 14b is then connected to the supporting ring 13 in the manner illustrated in FIGURES 4, 5 and 6. The looped end 17a of member 14b is first passed through the ring 13 as illustrated in FIGURE 4. After passing through ring 13 the looped end 17a is then opened up sufficiently as illustrated in FIGURE 5 to permit it to be passed over the upper end of the ring 13 and around the outside. This step is illustrated in FIGURE 6 after which the member 14b is tightened to pull the end 17a down into engaged position with the ring 13 as illustrated in FIGURE 3.

The remaining three legs 12 of the sling in FIGURE 1 are assembled in the fashion described with their upper ends connected into the ring 13 to provide a complete lifting sling structure as illustrated.

In FIGURE 2 the two leg sling illustrated is made up in essentially the same fashion described above for the four leg sling. In this case the load is illustrated as a bundle 18 of elements which may be held together by wrapping two of the loop members 14 around the bundle 18 at spaced positions. Again the sling leg member 14a is attached to the loop member 14 in the general fashion illustrated in FIGURE 3. Also if needed to provide the proper geometrical configuration for the sling a second loop member 14b may be attached to the lower member 14a and extended to connect with the ring 13 in the manner described in connection with FIGURES 4, 5 and 6. The second leg of the two leg sling is similarly assembled to complete the arrangement illustrated. It will be evident that where the load is of large proportions two or more of the tension members 14 may be looped together to form a longer member to pass around the load. The tension portion of the sling leg can then be connected in the manner shown at 16, 16a in FIGURE 3.

In some instances sharp edged loads must be lifted and these may cause damage to the webbing or loop elements. In FIGURE 7 a metal member 19 is illustrated connected to a sling leg. In this case the member 20 which is wrapped around the load element 19 is made from chain having looped ends 21. By connecting the tension member 22 into the looped ends 21, the sling leg is assembled to suit the situation in the same general fashion as illustrated in FIGURE 3.

FIGURE 8 illustrates the construction of a ring which is suitable for use with the slings of the present invention. In many instances it is desired to provide a sling which has no heavy metal parts such as might cause damage to the load after it is set down in position and the sling released from the lifting hook. This construction is of particular value in cases where the loads are being lifted by means of a helicopter using a releasable sling hook where the sling unit may be unattended by ground personnel and therefore must be dropped when released. Such a hook and mode of operation is illustrated in U.S. Patent 2,904,369 issued September 15, 1959. For this purpose the ring 23 may be fabricated from fabric webbing in the general manner illustrated. In the example shown one end of the webbing 24 is located at the inner surface of the ring 23, the ring being formed by wrapping a length of webbing around itself to form several layers, the number being sufficient to develop the strength desired in the ring. The end of the webbing 24 may be sewn as illustrated at 25 to retain it in position and the outer end of the webbing 26 may also be sewn as illustrated at 27. In order to retain the wraps of the webbing in proper relationship to maintain the ring shape stitching such as indicated at 28 may be used. Stitches 28 pass through from the outer side of the ring 23 to the inner side and thus prevent the layers of webbing from shifting out of position. The size of the ring 23 may be made to suit the requirements of the sling. In some instances it might be desirable to provide a large diameter ring of sufficient size to allow ready engagement with a helicopter hook pick-up system such as illustrated in co-pending application Serial No. 821,055 filed June 17, 1959.

From the foregoing it will be evident that by use of the sling system illustrated and described many different types of loads may be handled. Using complete tension elements with looped ends for the system permits the joining together of the tension elements to adjust the length required either for wrapping around to connect to the load or for connecting the desired length of sling leg. By having loop members of different lengths sling legs may be assembled quickly to the required condition. By using flexible members formed from chain further utility may be given to the sling system. The sequential assembly of the sling legs from the lower end to the upper allows rapid assembly of a sling including attachment to the upper ring member without the need for metal connector parts such as bolts, fittings or shackles. This system then allows attaching and assembling slings to suit many different shapes of loads with a minimum number of parts. The use of a flexible ring with the looped tension members further provides for elimination of heavy metal parts where this might be detrimental to the unloading operation. It will be noted that where sling leg length adjustment shorter than the length of one of the tension members is desired this can be attained by folding one of the tension members to make the desired length.

I claim:
1. A sling system having a plurality of divergent legs, each leg of the system including a plurality of mutually separable flexible tension members, each of said tension members having a closed loop at each end, each leg being assembled with a first of said tension members wrapped around a portion of the load to be lifted and having a first looped end directed away from the load, a second of said tension members having a second looped end threaded through said first looped end and a third looped end threaded through said second looped end, said second member having its said third looped end extended in a direction away from said load to form at least a portion of one of said legs, a sling ring member, and one looped end of each sling leg being threaded through said ring member and then opened and brought back over the entire said ring member to provide for transfer of forces produced by said load to said ring member.

2. A sling system according to claim 1 wherein each of said tension members is formed from fabric webbing.

3. A sling system according to claim 1 wherein said ring member is formed from fabric webbing.

4. A sling system according to claim 1 wherein each of said tension members is a continuous band.

5. A sling system according to claim 1 wherein said sling ring member is unsupported.

References Cited in the file of this patent

UNITED STATES PATENTS

| | | |
|---|---|---|
| 909,448 | Peirce | Jan. 12, 1909 |
| 1,378,225 | Goldman | May 17, 1921 |
| 1,591,105 | Rolland | July 6, 1926 |
| 1,931,808 | Andersen | Oct. 24, 1933 |
| 2,827,017 | Ryan | Mar. 18, 1958 |
| 2,903,291 | Barthule | Sept. 8, 1959 |
| 2,985,480 | Otley | May 23, 1961 |

FOREIGN PATENTS

| | | |
|---|---|---|
| 153,367 | Australia | Sept. 24, 1953 |
| 218,467 | Great Britain | July 10, 1924 |
| 265,549 | Great Britain | Oct. 20, 1927 |
| 423,391 | Great Britain | Jan. 31, 1935 |
| 559,694 | Great Britain | Mar. 1, 1944 |

OTHER REFERENCES

"The Ashley Book of Knots," by Clifford W. Ashley, published by Doubleday & Co., Inc. Garden City, N.Y., 1946. Pages 51, 71, 92, 269, 270, 294, 311 and 349 relied on. (Copy in Division 21.)

"Encyclopedia of Knots and Fancy Rope Work," by Graumont-Hensel, Fourth Edition, published by Cornell Maritime Press, Cambridge, Md., 1958, page 25, plate 5 relied upon (copy in Division 5).

Tuffy Sling Handbook S1—No. 2, Copyright 1955 by Union Wire Rope Corp., 21st and Manchester, Kansas City 26, Missouri. (Copy in Patent Office Division 34, Class 294, Sub-Class 78.)